United States Patent
Mubarek et al.

(10) Patent No.: US 8,463,269 B2
(45) Date of Patent: Jun. 11, 2013

(54) SYSTEM AND METHOD OF WIRELESS NETWORK SELECTION BASED ON LIST PRIORITIZED BY SERVICE OFFERED

(75) Inventors: Omer Mubarek, Kanata (CA); Jeffrey Wirtanen, Kanata (CA); M. Khaledul Islam, Kanata (CA); Richard Sims, Teddington (GB); Trevor Plestid, Kanata (CA)

(73) Assignee: Research In Motion Limited, Waterloo (CA)

( * ) Notice: Subject to any disclaimer, the term of this patent is extended or adjusted under 35 U.S.C. 154(b) by 646 days.

(21) Appl. No.: 12/389,865

(22) Filed: Feb. 20, 2009

(65) Prior Publication Data

US 2010/0216465 A1 Aug. 26, 2010

(51) Int. Cl.
- *H04W 4/00* (2009.01)
- *H04W 36/00* (2009.01)
- *H04B 7/00* (2006.01)
- *H04L 12/66* (2006.01)

(52) U.S. Cl.
USPC ............. 455/435.3; 455/435.1; 455/435.2; 455/443; 455/444; 455/525; 370/328; 370/331; 370/352

(58) Field of Classification Search
USPC .......... 455/435.1, 435.2, 435.3, 432.1, 443, 455/444, 525; 370/328, 331, 332, 352
See application file for complete search history.

(56) References Cited

U.S. PATENT DOCUMENTS

| | | | |
|---|---|---|---|
| 7,197,312 B2 | 3/2007 | Gunaratnam et al. | |
| 7,991,381 B1 * | 8/2011 | Dunne et al. | 455/404.1 |
| 2003/0031150 A1 | 2/2003 | Yukie | |
| 2003/0134637 A1 | 7/2003 | Cooper | |
| 2005/0037755 A1 * | 2/2005 | Hind et al. | 455/435.3 |
| 2005/0085228 A1 | 4/2005 | Welnick et al. | |
| 2005/0227720 A1 * | 10/2005 | Gunaratnam et al. | 455/510 |
| 2007/0275719 A1 | 11/2007 | Lee et al. | |
| 2008/0085707 A1 * | 4/2008 | Fadell | 455/435.3 |

FOREIGN PATENT DOCUMENTS

WO 2008046445 4/2008

OTHER PUBLICATIONS

European Search Report dated Jul. 13, 2009 from corresponding European Patent Application No. 09153376.0, 2 pages.

* cited by examiner

*Primary Examiner* — Vladimir Magloire
*Assistant Examiner* — Edd Rianne Plata
(74) *Attorney, Agent, or Firm* — Novak Druce Connolly Bove + Quigg LLP (57) ABSTRACT

Provided is a system and method of wireless network selection based on service offered. The wireless device scans for available wireless networks upon an event triggering registration. If the wireless device determines based on its SIM that none of the available wireless networks are high priority networks for registration, then the wireless device automatically selects an available wireless network for registration based on, for at least one of the available wireless networks that the wireless device previously registered to, whether CS (Circuit Switched) service was rejected but PS (Packet Switched) service was allowed. Next, the wireless device automatically attempts to register with the selected wireless network. In this manner, the wireless device attempts to register with a wireless network that does not reject CS service while allowing PS service. If the wireless device nonetheless registers with such a wireless network, then registration can be reattempted with another available wireless network.

23 Claims, 7 Drawing Sheets

SYSTEM AND METHOD OF WIRELESS NETWORK SELECTION BASED ON LIST PRIORITIZED BY SERVICE OFFERED

FIELD OF THE DISCLOSURE

This disclosure relates to wireless communication, and more particularly to wireless network selection.

BACKGROUND

Before a wireless device can provide a user with wireless functionality such as telephony and messaging, the wireless device registers with a wireless network. There may be a plurality of available wireless networks in a given geographic coverage area. Therefore, the wireless device selects one of the available wireless networks for registration. After registering with the selected network, the wireless device might operate in an idle mode where it camps on a communication channel of the wireless network to monitor for calls or messages, or initiate communication.

Wireless network selection typically involves the wireless device selecting the wireless network to which the wireless device was last registered, if available. However, if the last registered network is unavailable, which might be the case if the wireless device has moved to another geographic coverage area, then the wireless device selects another wireless network. The wireless device might have a SIM (Subscriber Identity Module) containing information identifying high priority networks including a home network and preferred roaming networks. Therefore, when the last registered network is unavailable, the wireless device can select another wireless network according to the information stored in the SIM.

The information stored in the SIM might be limited to a geographical region such as a country or a set of countries. This is because the preferred roaming networks depend on various roaming agreements. Therefore, in some situations when a user travels to another country, the wireless device might not be able to find the home network or any of the preferred roaming networks indicated in the SIM. Train travel with the wireless device can trigger this problem. In this situation, the wireless device might randomly select an available wireless network for registration from those available wireless networks that offer strong RSSI (Received Signal Strength Indication) such as RSSI≧−85 dBm for GSM (Global System for Mobile communications) and RSSI≧−95 dBm for UMTS (Universal Mobile Telecommunications System). If there are no wireless networks that offer strong RSSI, then the wireless device might select the wireless network that offers the strongest RSSI. Unfortunately, the wireless network selected in this manner might not be preferred over other available wireless networks in terms of service offered. For instance, the wireless network selected might not offer CS (Circuit Switched) service together with PS (Packet Switched) service for the wireless device.

The wireless device might have no way of detecting preferred networks. For example, if the wireless device is in automatic mode with a SIM that does not have a PLMN (Public Land Mobile Network) selector to identify preferred roaming networks, then the wireless device will have no way of selecting a preferred PLMN. To address this problem, a home carrier network can employ a managed roamer box. A registration request from the wireless device is routed through a foreign network back to the home network. Upon determining that the foreign network is not preferred, the managed roamer box of the home network sends a CS attach reject code 17 to the wireless device via the foreign network. Upon receiving the rejection, the wireless device will make three further registration requests and if these are rejected with the same cause then the wireless device might attempt to register with other wireless networks and might be able to register with a preferred network. The wireless device might make several attempts to register with several different networks on an on-going basis. The managed roamer box will eventually allow registration with a foreign network that is not preferred after five registration attempts.

The managed roamer box might not reject PS services in some networks such as NMO2 (Network Mode of Operation 2) networks or NMO1 (Network Mode of Operation 1) networks. Therefore, upon registering with the wireless network that is not preferred, the wireless device might be PS attached while at the same time not being CS attached. Therefore, the wireless device might be able to establish an active PDP (Packet Data Protocol) context for use in data communication, but will not be reachable via CS calls or SMS. The wireless device might indicate to the user that a GPRS (General Packet Radio Service) network has been acquired, yet the user might be unaware that they are not reachable via CS voice. Furthermore, in some cases as per standards, there is no network reselection trigger. Therefore, the inability to receive a CS voice call or SMS continues. This can be undesirable for the user of the wireless device.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to a broad aspect, there is provided a method for execution in a wireless device, the method comprising: determining available wireless networks upon an event triggering registration; determining whether any of the available wireless networks have been previously identified as high priority networks for registration; and if none of the available wireless networks have been previously identified as high priority networks for registration: selecting an available wireless network for registration based on, for at least one of the available wireless networks that the wireless device previously registered to, whether Circuit Switched 'CS' service was rejected but Packet Switched 'PS' service was allowed.

According to another broad aspect, there is provided a computer readable medium having computer executable instructions stored thereon for execution on a processor so as to implement a method comprising: determining available wireless networks upon an event triggering registration; determining whether any of the available wireless networks have been previously identified as high priority networks for registration; and if none of the available wireless networks have been previously identified as high priority networks for registration: selecting an available wireless network for registration based on, for at least one of the available wireless networks that the wireless device previously registered to, whether Circuit Switched 'CS' service was rejected but Packet Switched 'PS' service was allowed.

According to another broad aspect, there is provided a wireless device comprising: a wireless access radio configured for determining available wireless networks upon an event triggering registration; and a network selector configured for: determining whether any of the available wireless networks have been previously identified as high priority networks for registration; and if none of the available wireless networks have been previously identified as high priority networks for registration: selecting an available wireless network for registration based on, for at least one of the available wireless networks that the wireless device previously registered to, whether Circuit Switched 'CS' service was rejected but Packet Switched 'PS' service was allowed.

Other aspects and features of the present disclosure will become apparent, to those ordinarily skilled in the art, upon review of the following description of the specific embodiments of the disclosure.

Communication System

Figure 1A:
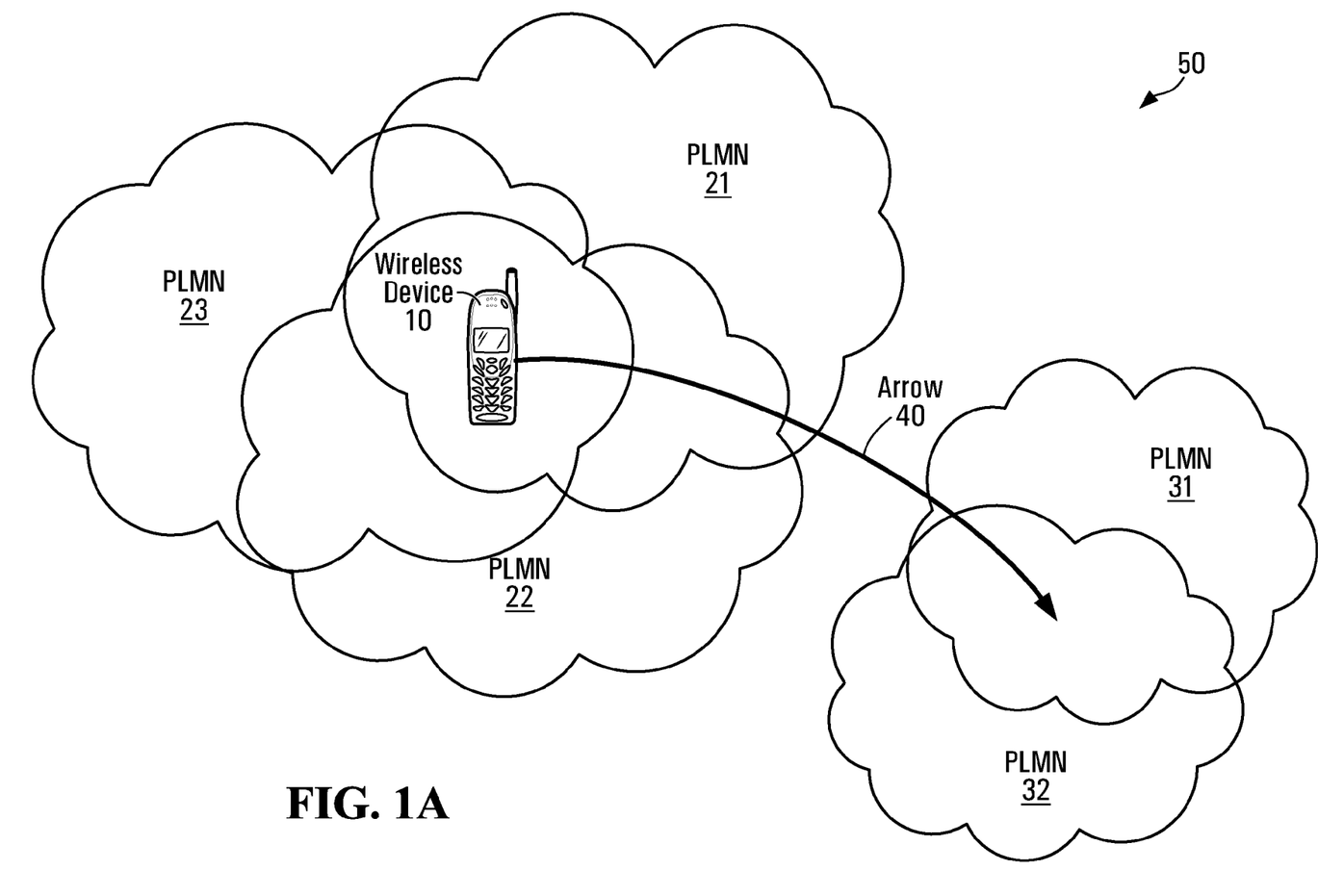
FIG. 1A is a block diagram of a wireless system featuring a wireless device and a plurality of wireless networks.
Figure 1B:
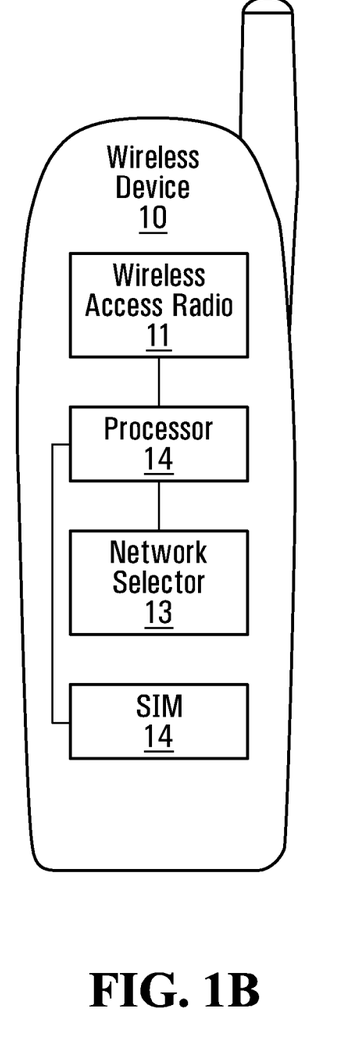
FIG. 1B is a block diagram of the wireless device shown in FIG. 1A.

Referring first to FIG. 1A, shown is a block diagram of a wireless system 50 featuring a wireless device 10 and a plurality of wireless networks 21,22,23,31,32. In the illustrated example, it is assumed that each wireless network is a PLMN (Public Land Mobile Network). However, more generally, each wireless network may be any appropriate wireless network. In specific implementations, the wireless networks are 3GPP PLMNs. Example details of the wireless device 10 are shown in FIG. 1B. The wireless device 10 has a wireless access radio 11, a processor 12, a network selector 13, and a SIM (Subscriber Identity Module) 14. The SIM 14 might for example be a USIM (Universal Subscriber Identity Module). The wireless system 50 and the wireless device 10 may have other components, but they are not shown for sake of simplicity.

The operation of the wireless device 10 will now be described by way of example with reference to FIGS. 1A and 1B. The SIM 14 contains information that identifies high priority networks for registration. The high priority networks might for example include a home network together with other wireless networks from roaming partners. The high priority networks are typically networks for which there are various roaming agreements in place. The roaming agreements typically allow use of specific wireless networks from roaming partners without being costly for the end user. In the illustrated example, it is assumed that only PLMNs 21 and 22 are identified in the SIM 14 as being high priority networks for registration. All other PLMNs 23, 31, and 32 are not identified in the SIM 14.

When the wireless device 10 is powered on, or when the wireless device 10 loses coverage, the wireless device 10 will attempt to register with a network. In the illustrated example, it is assumed that the wireless device 10 is powered on by its user after moving to its current location from a position outside the coverage area of the PLMNs 21, 22, 23. Once powered on, the wireless device 10 scans for available wireless networks and finds that there are three available wireless networks in its present area: PLMNs 21, 22, and 23. The network selector 13 determines that the wireless device 10 was not last registered to any of the three available wireless networks. Therefore, the wireless device 10 cannot register with the last registered wireless network. However, the network selector 13 determines based on the SIM 14 that there are high priority networks available, namely PLMNs 21, and 22. Thus, the wireless device 10 will register with one of the PLMNs 21, and 22. The wireless device 10 might select one of the PLMNs 21, and 22 based on some suitable criterion, for example RSSI (Received Signal Strength Indication).

Subsequent to registering with one of the PLMNs 21, 22, it is assumed that there is movement of the wireless device 10 to another geographical region as indicated by arrow 40. The movement causes the wireless device 10 to lose coverage and therefore another registration is triggered. The wireless device 10 scans for available wireless networks and finds that there are two available wireless networks in its new area: PLMNs 31 and 32. The network selector 13 determines that the wireless device 10 was not last registered to any of the two available wireless networks. Therefore, the wireless device 10 cannot register with the last registered wireless network. As noted above, the SIM 14 does not indicate that either of the PLMNs 31 and 32 in the new area are high priority networks. Once the network selector 13 determines based on the SIM 14 that none of the available wireless networks are high priority networks, then the network selector 13 selects an available wireless network for registration.

According to an embodiment of the disclosure, the network selection is based on, for at least one of the available wireless networks that the wireless device previously registered to, whether CS service was rejected (e.g. with cause code #17) but PS service was allowed. In some implementations, for each available wireless network that the wireless device previously registered to, the wireless device maintains information indicative of the type of service provided upon registration. The network selector 13 selects a wireless network that, based on the maintained information, is less likely than other available wireless networks to reject CS service (e.g. with cause code #17) while allowing PS service. Once the available wireless network has been selected, the network selector 13 attempts to register with that available wireless network.

In the illustrated example, it is assumed that upon previous registration with the PLMN 32, both CS service and PS service was allowed. It is also assumed that there was no previous registration with the other PLMN 31. Thus, assuming that the network selector 13 is configured to prefer wireless networks that allow both CS service and PS service over wireless networks that do not, the wireless device 10 will attempt to register with the PLMN 32 that previously allowed both CS service and PS service rather than attempting to register with the other PLMN 31 that may or may not reject CS service. In specific implementations, the network selector 13 is also configured to prefer wireless networks that allow only CS service over wireless networks that offer only PS service.

By considering the type of service previously provided upon registration, the wireless device 10 can register with the PLMN 32 that is less likely than the other PLMNs 31 to reject CS service (e.g. with cause code #17) while allowing PS service. In some implementations, the wireless device 10 avoids attempts to register with those wireless networks that previously rejected CS service (e.g. with cause code #17) but allowed PS service upon previous registration. The wireless device 10 might for example select an available wireless network that did not previously reject CS service (e.g. with cause code #17) but allow PS service upon previous registration. Thus, the undesirable situation where the wireless device 10 is unable to receive CS voice calls despite being registered to a wireless network can be avoided.

In some implementations, both the network selection and the attempt to register with the selected network are performed automatically. Advantageously, for such implementations there is no need for user intervention even when there are no high priority networks available. This can enhance the user experience. For instance, the undesirable situation where the wireless device 10 is unable to receive CS voice calls despite being registered to a wireless network can be avoided without any involvement from the user. In alternative implementations, the network selection and/or the attempt to register with the selected network involve user input. For example, manual selection of an available network can be performed.

The examples presented herein refer to a wireless device "scanning" for available networks. More generally, embodiments are applicable to a wireless device "determining" available networks. In some implementations, determining available networks includes identifying wireless networks that have sufficient signal strength. Scanning for available networks is an example of how the wireless device might determine available networks. Alternatively, the wireless device might be provided with a predefined list of available networks in a given area. Other ways for determining available networks might be possible.

In the illustrated example, the network selector 13 is implemented as software and is executed on the processor 14. However, more generally, the network selector 13 may be implemented as software, hardware, firmware, or any appropriate combination thereof. Although shown as a single component, more generally, the network selector 13 may have one or more components. The one or more components may be integrated with other components. Also, functionality of the network selector 13 might be combined with other components. For example, in alternative implementations, the network selector 13 and the wireless access radio 11 are combined as a single component. Other implementations are possible.

Further details of the wireless network selection are provided below with reference to FIGS. 2 through 4.

Method of Wireless Network Selection

Figure 2:
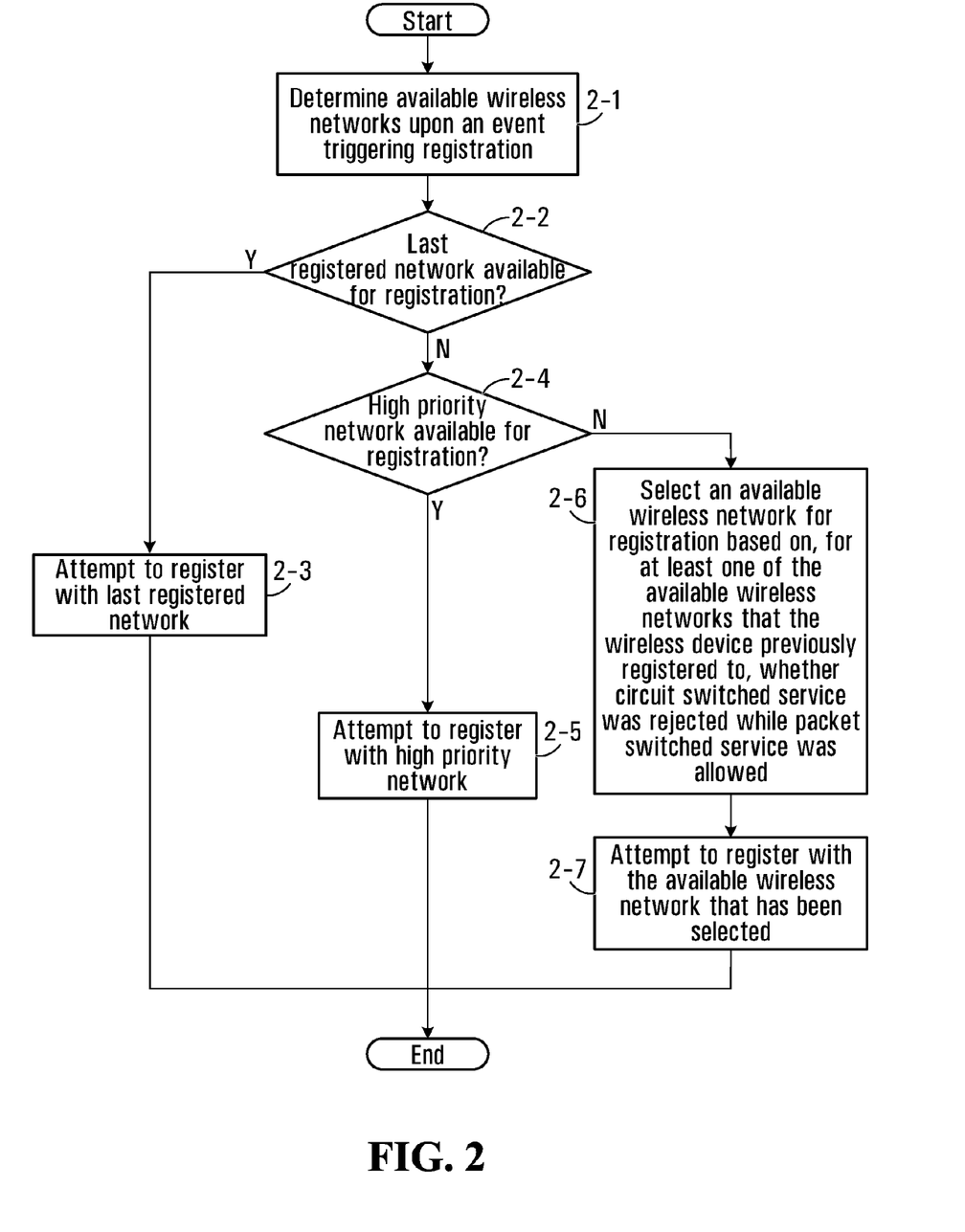
FIG. 2 is a flowchart of an example method of wireless network selection.

Referring now to FIG. 2, shown is a flowchart of an example method of wireless network selection. This method may be implemented in a wireless device, for example by the network selector 13 of the wireless device 10 shown in FIG. 1B. Alternatively, this method may be implemented in any appropriately configured wireless device.

The method starts with an event triggering registration, which might for example be when the wireless device is powered on, or when the wireless device loses coverage. In any case, the wireless device is not registered with a wireless network. Therefore, at step 2-1 the wireless device determines available wireless networks upon the event triggering registration. In some implementations, this involves scanning for available networks. However, alternative implementations are possible as discussed above with reference to FIG. 1. If at step 2-2 the wireless device determines that the last registered network is available for registration, then at step 2-3 the wireless device attempts to register with that wireless network.

However, if at step 2-2 the wireless device determines that the last registered network is not available for registration, then at step 2-4 the wireless device determines whether any of the available wireless networks have been previously identified as high priority networks for registration. Example details of how the wireless device might determine high priority networks have been described above with reference to FIG. 1A. If there is a high priority network available, then at step 2-5 the wireless device attempts to register with the high priority network.

However, if at step 2-4 there is no high priority network available, then at step 2-6 the wireless device selects an available wireless network for registration. According to an embodiment of the disclosure, the network selection is based on, for at least one of the available wireless networks that the wireless device previously registered to, whether CS service was rejected (e.g. with cause code #17) but PS service was allowed. In some implementations, for each available wireless network that the wireless device previously registered to, the wireless device maintains information indicative of the type of service provided upon registration. The wireless device selects a wireless network that, based on the maintained information, is less likely than other available wireless networks to reject CS service (e.g. with cause code #17) while allowing PS service. In some implementations, as indicated at step 2-7 the wireless device attempts to register with the available wireless network that has been selected. In some implementations, both the network selection and the attempt to register with the selected network are performed automatically. However, alternative implementations are possible as discussed above with reference to FIG. 1.

There are many ways to select a wireless network that, based on the maintained information, is less likely than other available wireless networks to reject CS service (e.g. with cause code #17) while allowing PS service. In some implementations, this is accomplished with use of priority levels. In a specific example, the wireless device associates each of the available wireless networks that the wireless device previously registered to with one of a plurality of priority levels that are indicative of whether CS service and PS service were allowed. The wireless device also associates each of the other available wireless networks with an unknown priority level. Finally, the wireless device selects an available wireless network based on the priority level of each available wireless network. Note that there is no need for maintained information to explicitly indicate whether CS service and PS service were allowed. Rather, by associating a wireless network with a priority level that is indicative of whether CS service and PS service were allowed upon previous registration, the wireless device has an indication of whether CS service and PS service were allowed upon previous registration.

The wireless device selects one of the available wireless networks from the highest priority level having at least one wireless network. Note that there may be more than one available wireless network belonging to the highest priority level. Thus, the wireless device might select between the available wireless networks of the highest priority level based on an additional criterion, for example RSSI. Note that in some instances, the wireless device might not know whether any of the available wireless networks will provide CS service. This might be the case if all of the available wireless networks belong to the unknown priority level. Therefore, the wireless device might select one of the available wireless networks based on the additional criterion. However, in other instances when the available wireless networks are divided amongst at least two different priority levels, the wireless device selects an available wireless network from the highest priority level.

Upon registering with the available wireless network that has been selected, if CS service is rejected (e.g. with cause code #17) but PS service is allowed, then in some implementations the wireless device selects another available wireless network for registration and attempts to register with that wireless network. Other implementations are possible. There may be several different registration attempts with different wireless networks, especially if the wireless device has not acquired both CS service and PS service and there are still unknown wireless networks that are available.

Detailed examples of how the network selection might be implemented using priority levels are provided below with reference to FIGS. 3 and 4.

Another Method of Wireless Network Selection

Figure 3A:
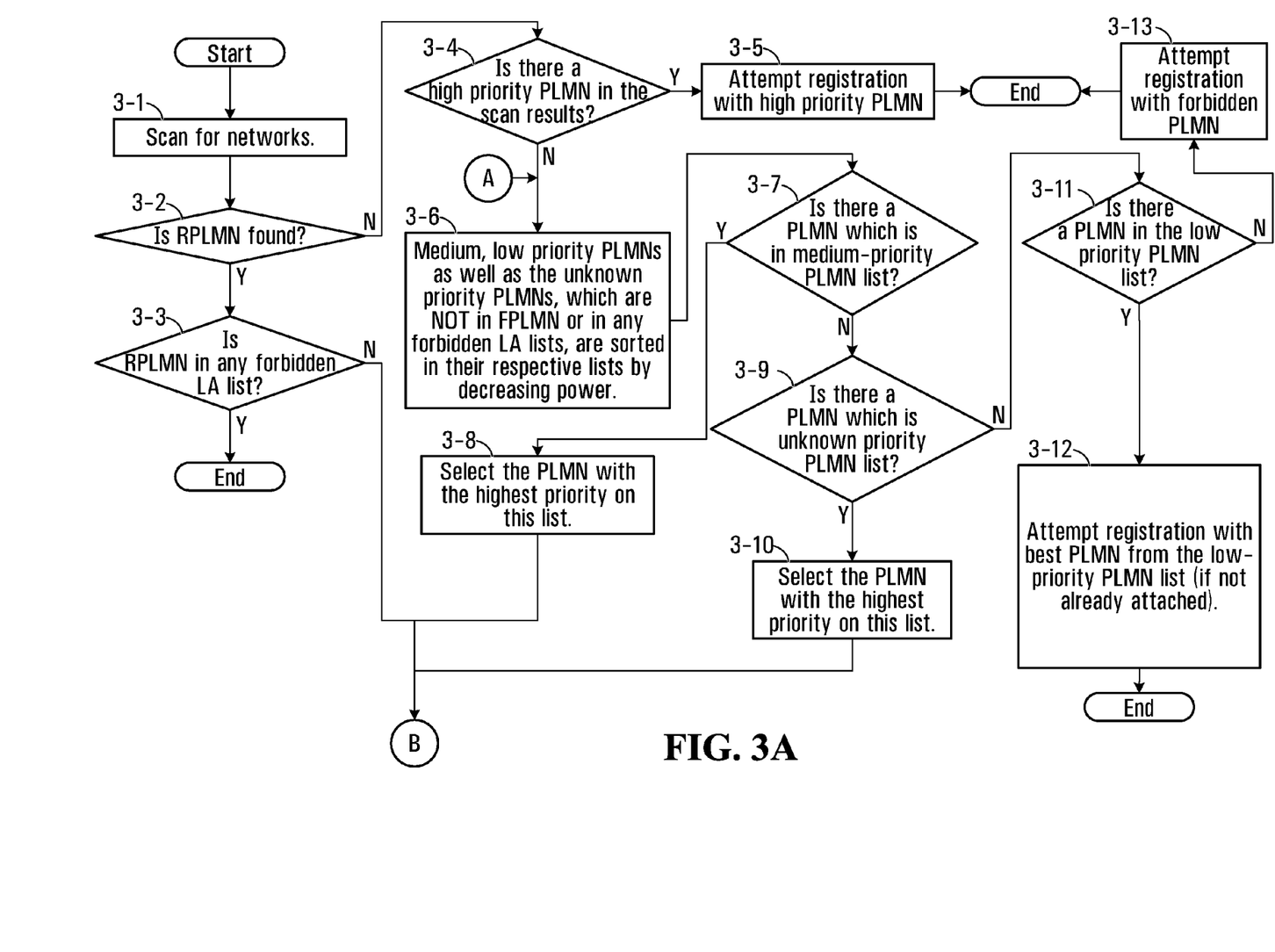
FIGS. 3A and 3B are flowcharts of another method of wireless network selection.
Figure 3B:
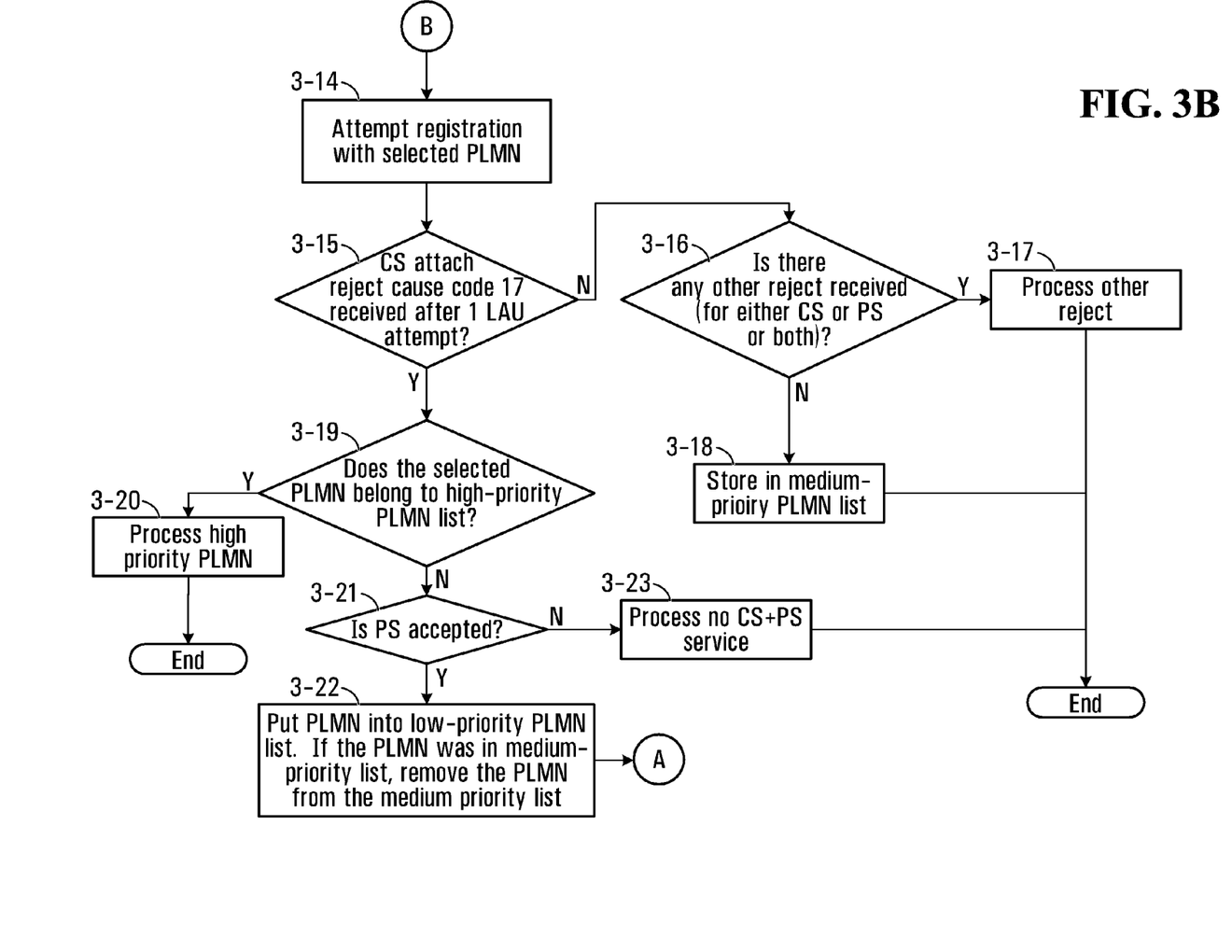

Referring now to FIGS. 3A and 3B, shown are flowcharts of another method of wireless network selection. This method may be implemented in a wireless device, for example by the network selector 13 of the wireless device 10 shown in FIG. 1B. Alternatively, this method may be implemented in any appropriately configured wireless device. It is to be understood that this method is very specific and is provided for exemplary purposes. Note that this method does not apply to wireless networks in which PS and CS service is obtained in a combined manner. An NMO1 network is an example of a network in which PS and CS service is obtained in a combined manner.

For this example, it is assumed that there is a high priority PLMN list that is created from the EFs (Elementary Files), which are the file storage system in the SIM. It is also assumed that the high priority PLMN list persists over radio cycles (i.e. radio being turned off and on) and is changed only if the EFs in the SIM are changed. The high priority PLMN list includes HPLMN (Home Public Land Mobile Network), EF_PLMN_Sel, EF_PLMNwACT and EF_OPLMNwACT, which are specific storage files in the SIM related to storage of higher priority PLMNs. It is also assumed that the SIM includes an FPLMN (Forbidden Public Land Mobile Network) list and forbidden LA (Location Area) lists for identifying forbidden PLMNs. The FPLMN list identifies PLMNs to which the wireless device should not attempt registration and is defined in 3GPP TS 23.122. The forbidden LA lists might for example include forbidden location areas for regional provision of service or forbidden location areas for roaming.

In accordance with an embodiment of the disclosure, the wireless device sorts non-high priority PLMNs that do not belong to the FPLMN list or any forbidden LA list into one of three priority lists. The three priority lists include a medium priority PLMN list, an unknown priority PLMN list, and a low priority PLMN list. These three priority lists are briefly described below:

Low priority PLMN list: This list identifies any PLMN that rejects CS Attach with cause #17, which indicates rejection of CS service. In some implementations, this list does not persist across radio cycles. In other implementations, this list persists across radio cycles for maintaining a record of low priority PLMNs even after the wireless device is reset or turned on after being turned off. In specific implementations, at expiry of a timer, this list is cleared. A high-priority PLMN cannot be added to this list. Also, any PLMN belonging to the FPLMN or any forbidden LA list cannot be added to the low priority PLMN list.

Medium priority PLMN list: This list identifies any PLMN that does not belong to high-priority PLMN list and with which the wireless device can register successfully for both CS service and PS service. In some implementations, this list does not persist across radio cycles. In other implementations, this list persists across radio cycles for maintaining a record of medium priority PLMNs even after the wireless device is reset or turned on after being turned off. In some implementations, upon expiry of a timer, this list is cleared. A high-priority PLMN cannot be added to this list. Also, any PLMN belonging to the FPLMN or any forbidden LA list cannot be added to the low priority PLMN list.

Unknown priority PLMN List: This list identifies any PLMN that does not belong to any of the following lists:
High Priority PLMN List;
Medium Priority PLMN List;
Low Priority PLMN List;
FPLMN; and
Any forbidden LA list.

For non-high priority wireless networks that the wireless device previously registered to, the medium and low priority PLMN lists are indicative of whether CS service was rejected (e.g. with cause code #17) while PS service was allowed. As will be described below, the wireless device uses these priority lists when selecting a PLMN for registration when there are no high priority PLMNs available. Thus, when there are no high priority PLMNs, wireless network selection is performed based on, for at least one wireless network that the wireless device previously registered to, whether CS service was rejected (e.g. with cause code #17) but PS service was allowed.

The method will now be described with reference to FIG. 3A. The method starts when the wireless device is powered on, or when the wireless device loses coverage. In either case, the wireless device is not registered with a wireless network. Therefore, at step 3-1 the wireless device scans for available wireless networks. If at step 3-2 the RPLMN (Registered Public Land Mobile Network) is found during the scan, then the wireless device stops the scanning and at step 3-3 checks if the cell found in the RPLMN belongs to an LA (Location Area) that is in one of the forbidden LA lists. If at step 3-3 the cell does not belong to any forbidden LA list, then the wireless device starts a registration procedure with the RPLMN as described below with reference to FIG. 3B. If at step 3-3 the cell does belong to a forbidden LA list, then the wireless device behaves as specified in 3GPP TS 23.122.

However, if at step 3-2 the RPLMN is not found during the scan, then at step 3-4 the wireless device determines based on its SIM whether there are any available high priority PLMNs. This might for example involve the wireless device determining whether any of the available PLMNs are identified in access technology information stored in the SIM. The access technology information might for example include "User Controlled PLMN Selector with Access Technology" and "Operator Controlled PLMN Selector with Access Technology" data fields. Alternatively, if there is no access technology information stored in the SIM, then the wireless device might for example determine whether any of the available PLMNs are identified in a "PLMN Selector" data field in the SIM. If there are high priority PLMNs, then at step 3-5 the wireless device attempts to register with one of the high priority PLMNs. In some implementations, the order that wireless device attempts to register with the high priority PLMNs is the order defined in TS 23.122 version 5.30 Section 4.4.3.1.1:
HPLMN (Home Public Land Mobile Network);

Each PLMN in the "User Controlled PLMN Selector with Access Technology" data field in the SIM (in order based on RSSI); and Each PLMN in the "Operator Controlled PLMN Selector with Access Technology" data field in the SIM (in order based on RSSI).

Other orders for selection of high priority PLMNs are possible.

However, if at step 3-4 the wireless device determines that there is no high priority PLMN, then at step 3-6 the wireless device sorts each of the available PLMNs that are not part of the FPLMN list or any forbidden LA list into one of three priority lists: medium priority PLMN list, low priority PLMN list and unknown priority PLMN list. Within each of these priority lists, the wireless device further sorts the PLMNs by decreasing RSSI.

After the wireless device has sorted the PLMNs at step 3-6, then at step 3-7 through 3-10 the wireless device selects and attempts registration on the sorted PLMNs in the following order:

each PLMN in the medium priority PLMN list, in order based on RSSI, at steps 3-7 and 3-8; and each PLMN in the unknown priority PLMN list, in order based on RSSI, at steps 3-9 and 3-10.

If the wireless device finds an available and allowable PLMN from either of these two priority lists, then the wireless device starts a registration procedure with the PLMN as described below with reference to FIG. 3B. Unfortunately, if the wireless device does not find any available and allowable PLMNs from these two priority lists, then all options to find a preferred PLMNs (other than those belonging to a forbidden PLMN or LA list) have been exhausted.

After exhausting the options to find a preferred PLMN, the wireless device has two options:

camp on one of the forbidden PLMNs or LAs and enter emergency service mode; and force full registration with a PLMN that originally sends CS Reject #17 and PS accept by sending LAU requests until the Managed Roamer Box allows registration so that the wireless device obtains full CS service and PS service from the PLMN.

In the illustrated example, it is assumed that the second option is exercised if there is a PLMN in the low priority PLMN list.

If at step 3-11 there is an available PLMN in the low priority PLMN list, then at step 3-12 the wireless device selects the PLMN with the highest RSSI and attempts to register with that PLMN. The Managed Roamer Box has an attempt counter that is incremented each time the wireless device attempts to register with the PLMN. The Managed Roamer Box will reject CS registration with cause #17 until the counter reaches 5. At the fifth attempt the wireless device successfully registers with the PLMN thereby forcing the Location Updating procedure to acquire CS service. If the wireless device receives another type of reject, then the wireless device removes this PLMN from the Low Priority PLMN list and proceeds with the next PLMN in this list.

However, if at step 3-11 the wireless device does not find any PLMNs in the low priority PLMN list, then at step 3-13 the wireless device attempts registration with a forbidden PLMN. The wireless device will typically not receive full service from the forbidden PLMN.

Referring now to FIG. 3B, the registration procedure with a selected PLMN will now be described. At step 3-14 the wireless device attempts registration with the selected PLMN. If the selected PLMN is identified in the unknown priority PLMN list, then the PLMN is removed from the unknown priority PLMN list and placed in either the low priority PLMN list or the medium priority PLMN list, according to service that the PLMN can provide, as will be described below. If at steps 3-15 and 3-16 the wireless device does not receive any rejection and successfully registers with the PLMN for both CS service and PS service, then at step 3-18 the wireless device identifies the PLMN in the Medium Priority PLMN list. If at step 3-15 the wireless device does not receive a CS Reject #17 and PS Accept, but at step 3-16 receives any other combination of CS and PS reject, then at step 3-17 the wireless device processes the rejection. This might for example, involve keeping the PLMN outside of the medium priority PLMN list, the unknown priority PLMN list, and the low priority PLMN list. In some implementations, the PLMN is added to the FPLMN list.

However, if at step 3-15 the wireless device receives a CS Reject cause #17 and PS Accept, then at step 3-19 the wireless device determines whether the PLMN belongs to the high-priority PLMN list. If the PLMN belongs to the high-priority PLMN list, then at step 3-20 the wireless device processes the high priority PLMN, for example as described in 3GPP TS 23.122. However, if the PLMN does not belong to the high-priority PLMN list, then at step 3-21 the wireless device determines whether PS service is allowed. If PS service is allowed, then at step 3-22 the wireless device identifies this PLMN in the Low Priority PLMN list. If the PLMN is identified in the Medium Priority PLMN list, then the wireless device removes the PLMN from this list. Processing goes back to Reference Node A (see step 3-16 in FIG. 3A) to select an appropriate PLMN among the non-high priority PLMNs. If at step 3-21 PS service was not allowed, then at step 3-23 the wireless device processes no CS and PS service, for example as described in 3GPP TS 23.122.

Note that if the RPLMN is found at the initial scan and the RPLMN does not belong to a forbidden LA list, then the wireless device will attempt registration with the RPLMN. In this scenario the wireless device will probably not receive any CS reject causes from the network. The reason for this is in order to add a PLMN into LAI as RPLMN the wireless device has to register successfully with that PLMN for CS services. However, it is possible to receive a CS reject from the RPLMN as some rejects are for temporary reasons or the previous registration could be from another LAI.

In the illustrated example described above with reference to FIG. 3, it is assumed that the wireless device sorts non-high priority PLMNs that do not belong to the FPLMN list or any forbidden LA list into three priority lists. More generally, the wireless device might sort such PLMNs into any suitable number of priority lists. An additional method will be described below with reference to FIG. 4 in which the wireless device sorts such PLMNs into two priority lists. It is to be understood that other implementations are possible.

Additional Method of Wireless Network Selection

Figure 4:
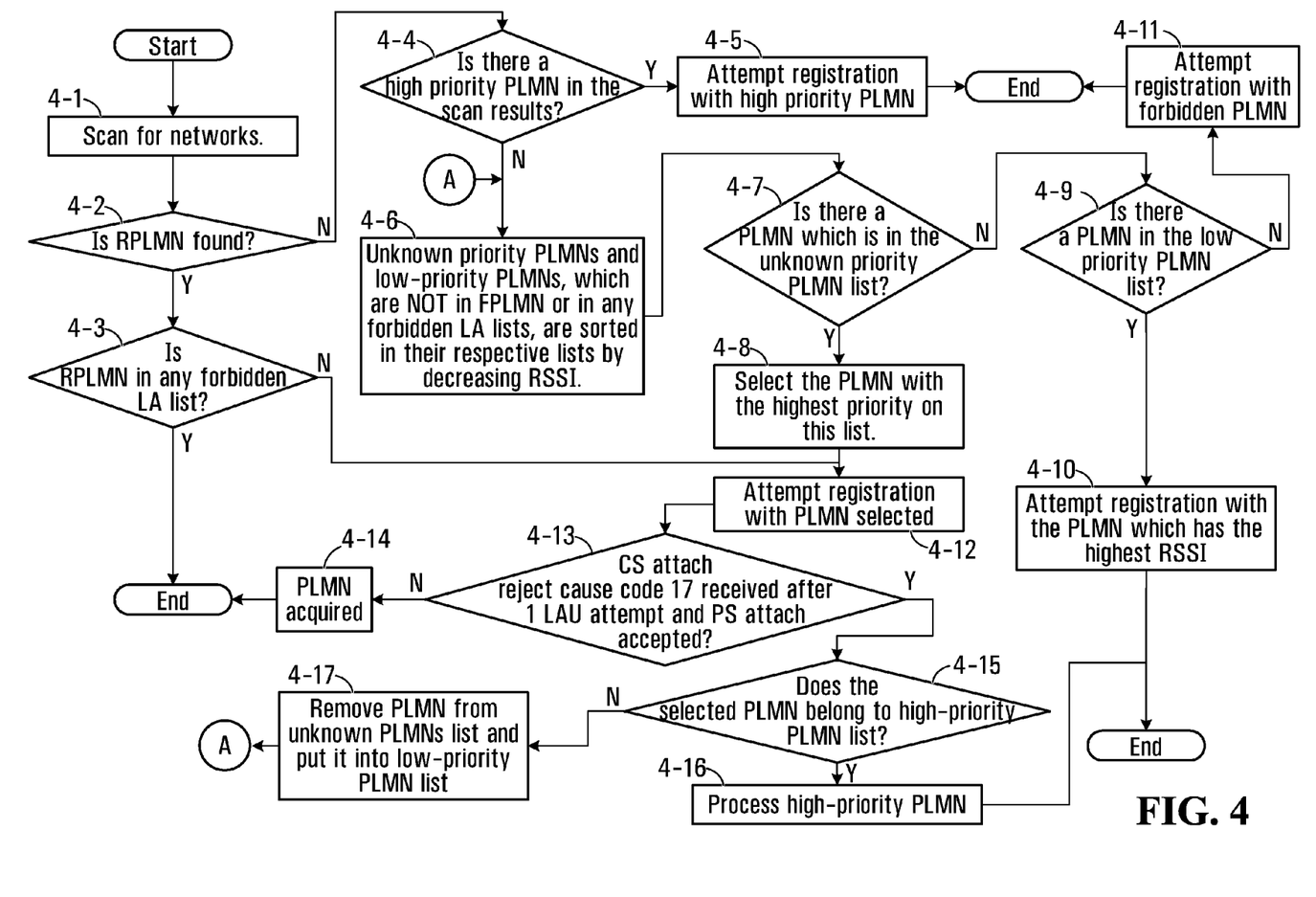
FIG. 4 is a flowchart of an additional method of wireless network selection.

Referring now to FIG. 4, shown is a flowchart of an additional method of wireless network selection. This method may be implemented in a wireless device, for example by the network selector 13 of the wireless device 10 shown in FIG. 1B. Alternatively, this method may be implemented in any appropriately configured wireless device. It is to be understood that this method is very specific and is provided for exemplary purposes. Note that this method does not apply to wireless networks in which PS and CS service is obtained in a combined manner. An NMO1 network is an example of a network in which PS and CS service is obtained in a combined manner.

For this example, it is assumed that there is a high priority PLMN list as described above with reference to FIGS. 3A and 3B. It is also assumed that the SIM includes an FPLMN list and forbidden LA lists as described above with reference to FIGS. 3A and 3B.

In accordance with an embodiment of the disclosure, the wireless device sorts non-high priority PLMNs that do not belong to the FPLMN list or any forbidden LA list into one of two priority lists. The two priority lists include an unknown priority PLMN list, and a low priority PLMN list. These two priority lists are briefly described below:

Low priority PLMN list: This list identifies any PLMN that rejects CS Attach with cause #17, which indicates rejection of CS service. In some implementations this list does not persist across radio cycles. In other implementations, this list persists across radio cycles for maintaining a record of low priority PLMNs even after the wireless device is reset or turned on after being turned off. In some implementations, upon expiry of a timer, this list is cleared. A high-priority PLMN cannot be added to this list. Also, any PLMN belonging to the FPLMN or any forbidden LA list cannot be added to the low priority PLMN list.

Unknown priority PLMN List: This list identifies any PLMN that does not belong to any of the following lists:
High Priority PLMN List;
Low Priority PLMN List;
FPLMN; and
Any forbidden LA list.

Note that the unknown priority PLMN list might include PLMNs that are known to provide both CS and PS service.

For non-high priority wireless networks that the wireless device previously registered to, the unknown and low priority PLMN lists are indicative of whether CS service was rejected but PS service was allowed. As will be described below, the wireless device uses these priority lists when selecting a PLMN for registration when there are no high priority PLMNs available. Thus, wireless network selection is performed based on, for at least one wireless network that the wireless device previously registered to, whether CS service was rejected but PS service was allowed.

The method will now be described with reference to FIG. 4. The method starts when the wireless device is powered on, or when the wireless device loses coverage. In either case, the wireless device is not registered with a wireless network. Therefore, at step 4-1 the wireless device scans for available wireless networks. If at step 4-2 the RPLMN (Registered Public Land Mobile Network) is found during the scan, then the wireless device stops the scanning and at step 4-3 checks if the cell found in the RPLMN belongs to an LA (Location Area) that is in one of the forbidden LA lists. If at step 4-3 the cell does not belong to any forbidden LA lists, then the wireless device starts a registration procedure with the RPLMN as described below with reference to step 4-12. If at step 4-3 the cell does belong to a forbidden LA list, then the wireless device behaves as specified in 3GPP TS 23.122.

However, if at step 4-2 the RPLMN is not found during the scan, then at step 4-4 the wireless device determines based on its SIM whether there are any available high priority PLMNs. This might for example involve the wireless device determining whether any of the available PLMNs are identified in access technology information stored in the SIM. The access technology information might for example include "User Controlled PLMN Selector with Access Technology" and "Operator Controlled PLMN Selector with Access Technology" data fields. Alternatively, if there is no access technology information stored in the SIM, then the wireless device might for example determine whether any of the available PLMNs are identified in a "PLMN Selector" data field in the SIM. If there are high priority PLMNs, then at step 4-5 the wireless device attempts to register with one of the high priority PLMNs. In some implementations, the order that the wireless device attempts to register with the high priority PLMNs is the order defined in TS 23.122 version 5.30 Section 4.4.3.1.1:

HPLMN (Home Public Land Mobile Network);
Each PLMN in the "User Controlled PLMN Selector with Access Technology" data field in the SIM (in order based on RSSI); and
Each PLMN in the "Operator Controlled PLMN Selector with Access Technology" data field in the SIM (in order based on RSSI).

Other orders for selection of high priority PLMNs are possible.

However, if at step 4-4 the wireless device determines that there is no high priority PLMN, then at step 4-6 the wireless device sorts each of the available PLMNs that are not part of the FPLMN list or any forbidden LA list into one of two lists: low priority PLMN list and unknown priority PLMN list. Within each of these priority lists, the wireless device further sorts the PLMNs by decreasing RSSI.

After the wireless device has sorted the PLMNs at step 4-6, then at step 4-7 and 4-8 the wireless device selects and attempts registration on the sorted PLMNs in the unknown priority PLMN list. In particular, if at step 4-7 the wireless device finds an available and allowable PLMN from the unknown priority PLMN list, then at step 4-8 the wireless device selects the PLMN with the highest priority and starts a registration procedure with the PLMN as described below with reference to step 4-12. Unfortunately, if the wireless device does not find any available and allowable PLMNs from the unknown priority PLMN list, then all options to find a preferred PLMN (other than those belonging to a forbidden PLMN or LA list) have been exhausted.

After exhausting the options to find a preferred PLMN, the wireless device has two options:
camp on one of the forbidden PLMNs or LAs and enter emergency service mode; and
force full registration with a PLMN that originally sends CS Reject #17 and PS Accept by sending LAU requests until the Managed Roamer Box allows registration so that the wireless device obtains full CS and PS service from the PLMN.

In the illustrated example, it is assumed that the second option is exercised if there is a PLMN in the Low Priority PLMN list.

If at step 4-9 there is an available PLMN in the Low Priority PLMN list, then at step 4-10 the wireless device selects the PLMN with the highest RSSI and attempts to register with that PLMN. The Managed Roamer Box has an attempt counter that is incremented each time the wireless device attempts to register with the PLMN. The Managed Roamer Box will reject CS registration with cause #17 until the counter reaches 5. At the fifth attempt the wireless device successfully registers with the PLMN thereby forcing the Location Updating procedure to acquire CS service. If the wireless device receives another type of reject, then the wireless device removes this PLMN from the Low Priority PLMN list and proceeds with the next PLMN in this list.

However, if at step 4-9 the wireless device does not find any PLMNs in the low priority PLMN list, then at step 4-11 the wireless device attempts registration with a forbidden PLMN. The wireless device will typically not receive full service from the forbidden PLMN, but will be able to make emergency calls in the emergency service mode.

Referring now to steps 4-12 through 4-17, the registration procedure with a selected PLMN will now be described. At step 4-12 the wireless device attempts registration with the selected PLMN. If at step 4-13 the wireless device does not receive a CS rejection with cause code 17 after 1 LAU attempt and PS attach is accepted, then at step 4-14 the wireless device has successfully registered with the PLMN for both CS and PS services. If at step 4-13 the wireless device receives a CS Reject #17 and PS Accept, then at steps 4-15 through 4-17 the wireless device processes the rejection. In particular, if at step 4-15 the wireless device determines that the selected PLMN belongs to the high priority PLMN list, then at step 4-16 the wireless device processes the high priority PLMN, for example as described in 3GPP TS 23.122. However, if at step 4-15 the wireless device determines that the selected PLMN does not belong to the high priority PLMN list, then at step 4-17 the wireless device removes the PLMN from the unknown priority PLMN list and puts it into the low priority PLMN list. Processing goes back to Reference Node A (see step 4-6) to select an appropriate PLMN among the PLMNs from the unknown priority PLMN list.

Note that if the RPLMN is found at the initial scan and the RPLMN does not belong to a forbidden LA list, then the wireless device will attempt registration with the RPLMN. In this scenario the wireless device will probably not receive any CS reject causes from the network. The reason for this is in order to add a PLMN into LAI as RPLMN the wireless device has to register successfully with that PLMN for CS services. However, it is possible to receive a CS reject from the RPLMN as some rejects are for temporary reasons or the previous registration could be from another LAI.

Another Wireless Device

Figure 5:
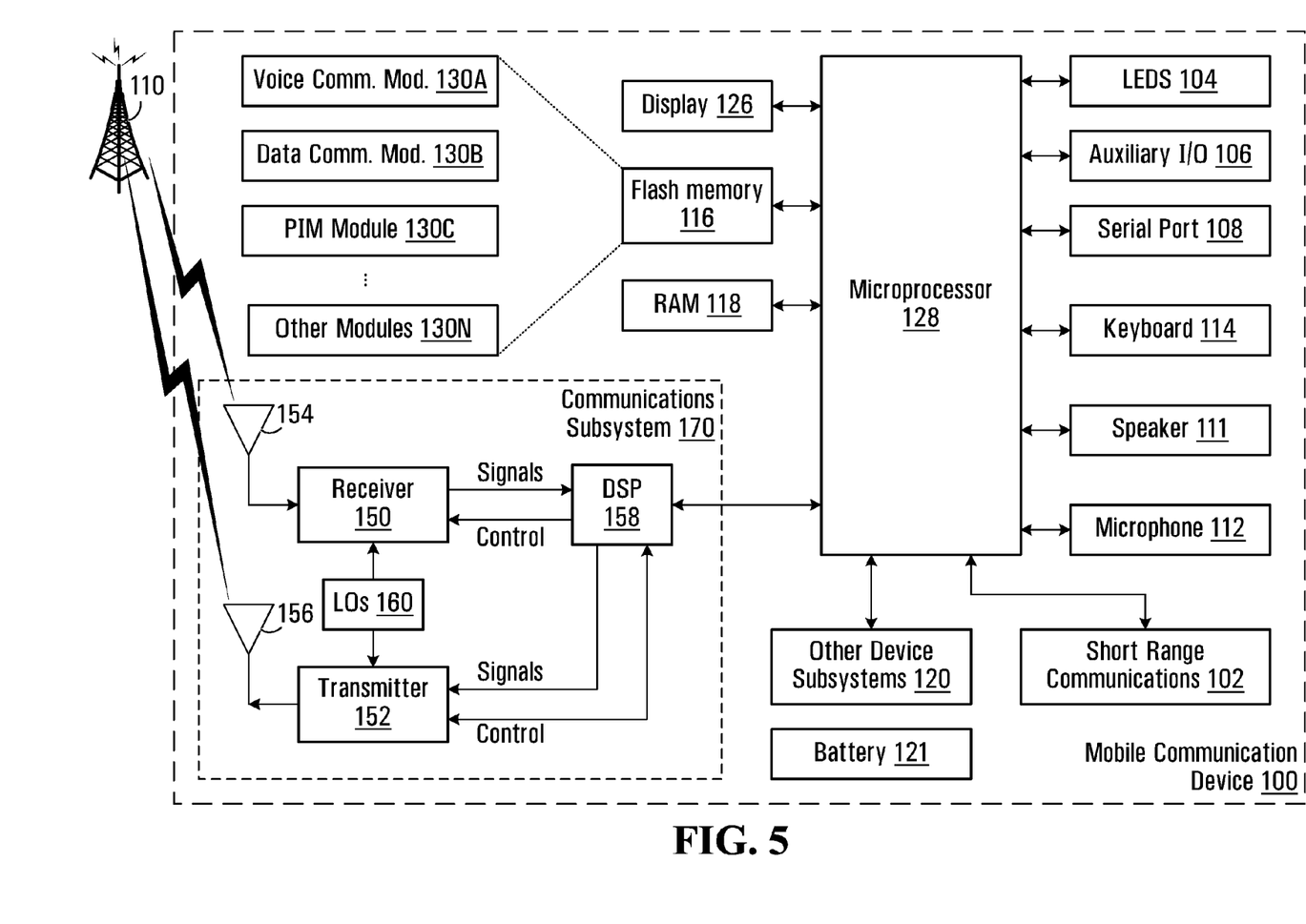
FIG. 5 is a block diagram of another wireless device.

Referring now to FIG. 5, shown is a block diagram of another wireless device 100 that may implement any of the wireless device methods described herein. The wireless device 100 is shown with specific components for implementing features similar to those of the wireless device 10 of FIG. 1B. It is to be understood that the wireless device 100 is shown with very specific details for exemplary purposes only.

A processing device (a microprocessor 128) is shown schematically as coupled between a keyboard 114 and a display 126. The microprocessor 128 is a type of processor with features similar to those of the processor 14 of the wireless device 10 shown in FIG. 1B. The microprocessor 128 controls operation of the display 126, as well as overall operation of the wireless device 100, in response to actuation of keys on the keyboard 114 by a user.

The wireless device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

The flash memory 116 stores computer executable instructions for implementing features similar to those of the network selector 13 of the wireless device 10 shown in FIG. 1B. In a specific implementation, the other module 130N of the flash memory 116 stores computer executable instructions that when executed implement a notification initiator. Note that the implementations described with reference to FIG. 5 are very specific for exemplary purposes.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a wireless access radio with features similar to those of the wireless access radio 11 of the wireless device 10 shown in FIG. 1B. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, and/or an 802.16

WiMAX network. Other types of data and voice networks, both separate and integrated, may also be utilized with the wireless device 100.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Numerous modifications and variations of the present disclosure are possible in light of the above teachings. It is therefore to be understood that within the scope of the appended claims, the disclosure may be practised otherwise than as specifically described herein.

We claim:

1. A method for execution in a wireless device, the method comprising:
   determining available wireless networks upon an event triggering registration;
   determining whether any of the available wireless networks have been previously identified as high priority networks for registration; and
   if none of the available wireless networks have been previously identified as high priority networks for registration:
   selecting an available wireless network for registration based on a prioritization of the available wireless networks;
   wherein for each available wireless network that the wireless device previously registered to, the available wireless network is associated with a low priority level if (i) the available wireless network has not been identified as a high priority network and (ii) Circuit Switched 'CS' service was rejected but Packet Switched 'PS' service was allowed;
   after registering with a given network, associating the given network with the low priority level if the given network rejects CS service but allows PS service.

2. The method of claim 1, further comprising:
   attempting to register with the available wireless network that has been selected.

3. The method of claim 2, wherein both selecting the available wireless network and attempting to register with the available wireless network that has been selected are executed automatically.

4. The method of claim 1, further comprising:
   upon determining that the wireless device was last registered to one of the available wireless networks, selecting that wireless network for registration;
   wherein determining whether any of the available wireless networks have been previously identified as high priority networks for registration is executed only upon determining that the wireless device was not last registered to any of the available wireless networks.

5. The method of claim 1, further comprising:
   upon determining that there is an available wireless network that has been previously identified as a high priority network for registration, selecting that wireless network for registration.

6. The method of claim 1, wherein the wireless device determines whether any of the available wireless networks have been previously identified as high priority networks for registration based on whether any of the available wireless networks are indicated on a Subscriber Identity Module 'SIM' of the wireless device to be high priority networks for registration.

7. The method of claim 1, wherein selecting an available wireless network for registration comprises:
   selecting an available wireless network that did not previously reject CS service but allow PS service upon previous registration.

8. The method of claim 1, further comprising:
   upon registering with the available wireless network that has been selected:

upon determining that CS service has been rejected, repeating the selecting step for another available wireless network.

9. The method of claim 1, wherein selecting an available wireless network for registration comprises:
associating each available wireless network that the wireless device previously registered to with one of a plurality of priority levels that are indicative of whether CS service and PS service were allowed;
associating each available wireless network that the wireless device was not previously registered to with an unknown priority level; and
selecting an available wireless network based on the priority level of each available wireless network.

10. The method of claim 9, wherein associating each available wireless network that the wireless device previously registered to with one of the plurality of priority levels that are indicative of whether CS service and PS service were allowed comprises:
upon registering with a given network:
(i) determining whether CS service and PS service are allowed by the given network;
(ii) associating the given network with the low priority level if the given network rejects CS service but allows PS service;
wherein selecting an available wireless network based on the priority level of each available wireless network comprises:
(i) selecting an available wireless network that is associated with the unknown priority level before selecting any available wireless network that is associated with the low priority level.

11. The method of claim 10, wherein associating each of the at least one available wireless network that the wireless device previously registered to with one of the plurality of priority levels that are indicative of whether CS service and PS service were allowed further comprises:
upon registering with the given network:
(iii) associating the given network with a medium priority level if the given network allows both CS service and PS service;
wherein selecting an available wireless network based on the priority level of each available wireless network further comprises:
(ii) selecting an available wireless network that is associated with the medium priority level before selecting any available wireless network that is associated with the unknown priority level.

12. The method of claim 10, wherein determining whether CS service and PS service are allowed by the given network comprises:
determining whether CS service and PS service are allowed by the given network based on responses from the given network.

13. The method of claim 12, wherein determining whether CS service and PS service are allowed by the given network based on responses from the given network comprises:
determining that CS service is not offered by the given network if a rejection is received with a cause code of 17.

14. The method of claim 9, wherein selecting an available wireless network based on the priority level of each available wireless network comprises:
identifying those available wireless networks that have a highest priority level of the plurality of priority levels;
selecting between the available wireless networks that have the highest priority level based on at least one criterion.

15. The method of claim 14, wherein the at least one criterion comprises a Received Signal Strength Indication 'RSSI'.

16. A non-transitory computer readable medium having computer executable instructions stored thereon for execution on a processor of a wireless device so as to implement a method comprising:
determining available wireless networks upon an event triggering registration;
determining whether any of the available wireless networks have been previously identified as high priority networks for registration; and
if none of the available wireless networks have been previously identified as high priority networks for registration:
selecting an available wireless network for registration based on a prioritization of the available wireless networks;
wherein for each available wireless network that the wireless device previously registered to, the available wireless network is associated with a low priority level if (i) the available wireless network has not been identified as a high priority network and (ii) Circuit Switched 'CS' service was rejected but Packet Switched 'PS' service was allowed;
after registering with a given network, associating the given network with the low priority level if the given network rejects CS service but allows PS service.

17. A wireless device comprising:
a wireless access radio configured for determining available wireless networks upon an event triggering registration; and
a network selector configured for:
determining whether any of the available wireless networks have been previously identified as high priority networks for registration; and
if none of the available wireless networks have been previously identified as high priority networks for registration:
selecting an available wireless network for registration based on a prioritization of the available wireless networks;
wherein for each available wireless network that the wireless device previously registered to, the available wireless network is associated with a low priority level if (i) the available wireless network has not been identified as a high priority network and (ii) Circuit Switched 'CS' service was rejected but Packet Switched 'PS' service was allowed;
after registering with a given network, associating the given network with the low priority level if the given network rejects CS service but allows PS service.

18. The wireless device of claim 17, wherein the network selector is configured for:
attempting to register with the available wireless network that has been selected.

19. The wireless device of claim 18, wherein both selecting the available wireless network and attempting to register with the available wireless network that has been selected are executed automatically.

20. The wireless device of claim 17, further comprising:
a Subscriber Identity Module 'SIM' that is pre-configured to identify the high priority networks for registration.

21. The wireless device of claim 17, wherein the network selector is configured for selecting an available wireless network that did not previously reject CS service but allow PS service upon previous registration.

22. The wireless device of claim 17, wherein the network selector is configured for:
  upon registering with the available wireless network that has been selected:
  upon determining that CS service has been rejected, repeating the selecting step for another available wireless network.

23. The wireless device of claim 17, wherein the network selector is configured for selecting an available wireless network for registration by:
  associating each of the at least one available wireless network that the wireless device previously registered to with one of a plurality of priority levels that are indicative of whether CS service and PS service were allowed;
  associating each of other available wireless networks with an unknown priority level; and
  selecting an available wireless network based on the priority level of each available wireless network.

* * * * *

UNITED STATES PATENT AND TRADEMARK OFFICE
CERTIFICATE OF CORRECTION

PATENT NO. : 8,463,269 B2  
APPLICATION NO. : 12/389865  
DATED : June 11, 2013  
INVENTOR(S) : Omer Mubarek et al.

Page 1 of 1

It is certified that error appears in the above-identified patent and that said Letters Patent is hereby corrected as shown below:

In the Specification

Column 9, line 31, "a preferred PLMNs (other than those belonging to a forbidden"

should read

--a preferred PLMN (other than those belonging to a forbidden--.

Signed and Sealed this
Seventeenth Day of September, 2013

Teresa Stanek Rea
*Deputy Director of the United States Patent and Trademark Office*